W. H. ZACHMANN.
SPEEDOMETER.
APPLICATION FILED APR. 19, 1912.
1,067,453.
Patented July 15, 1913.
2 SHEETS—SHEET 2.
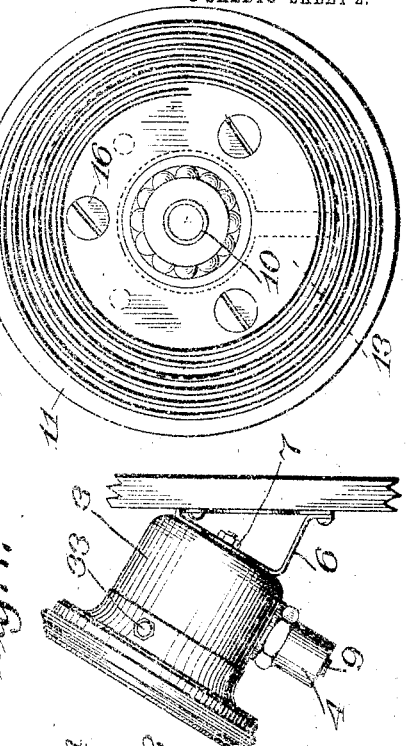
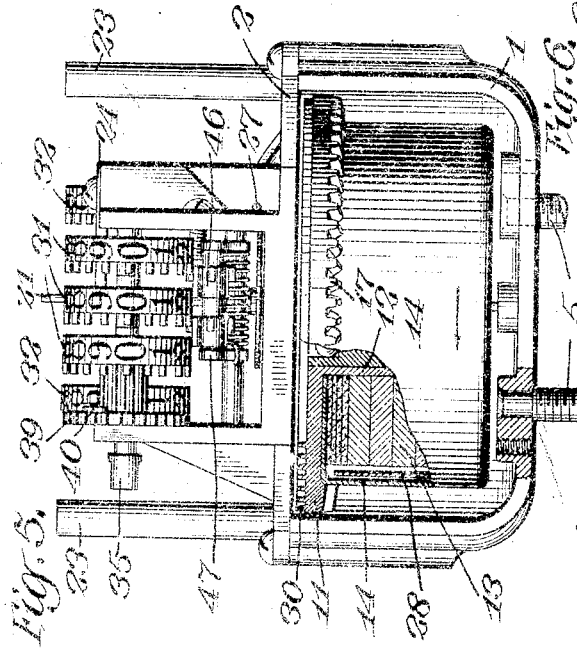
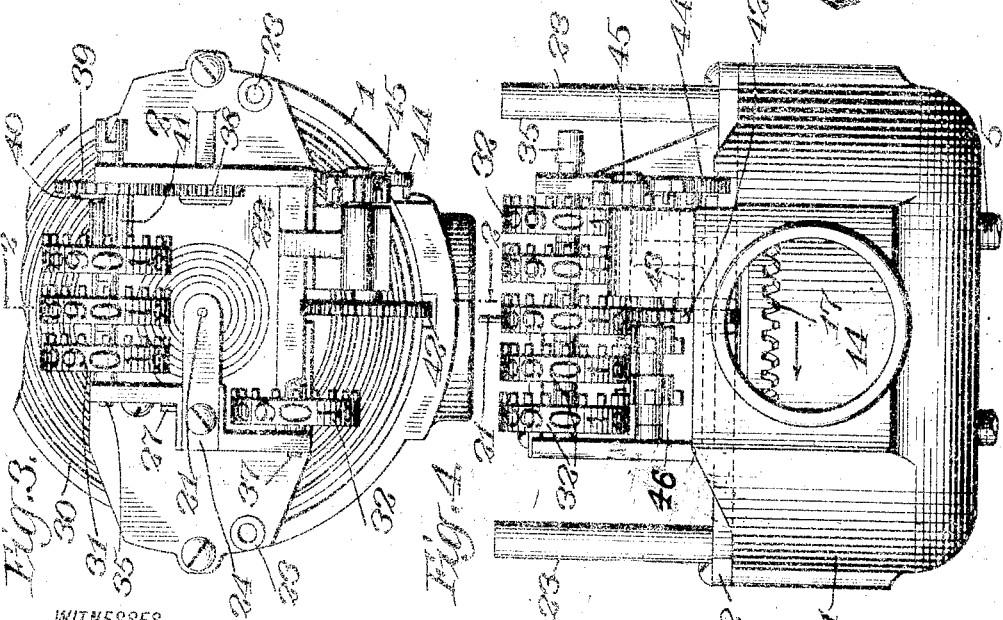
WITNESSES
INVENTOR
William H. Zachmann
BY
Henry D. Williams
ATTORNEY

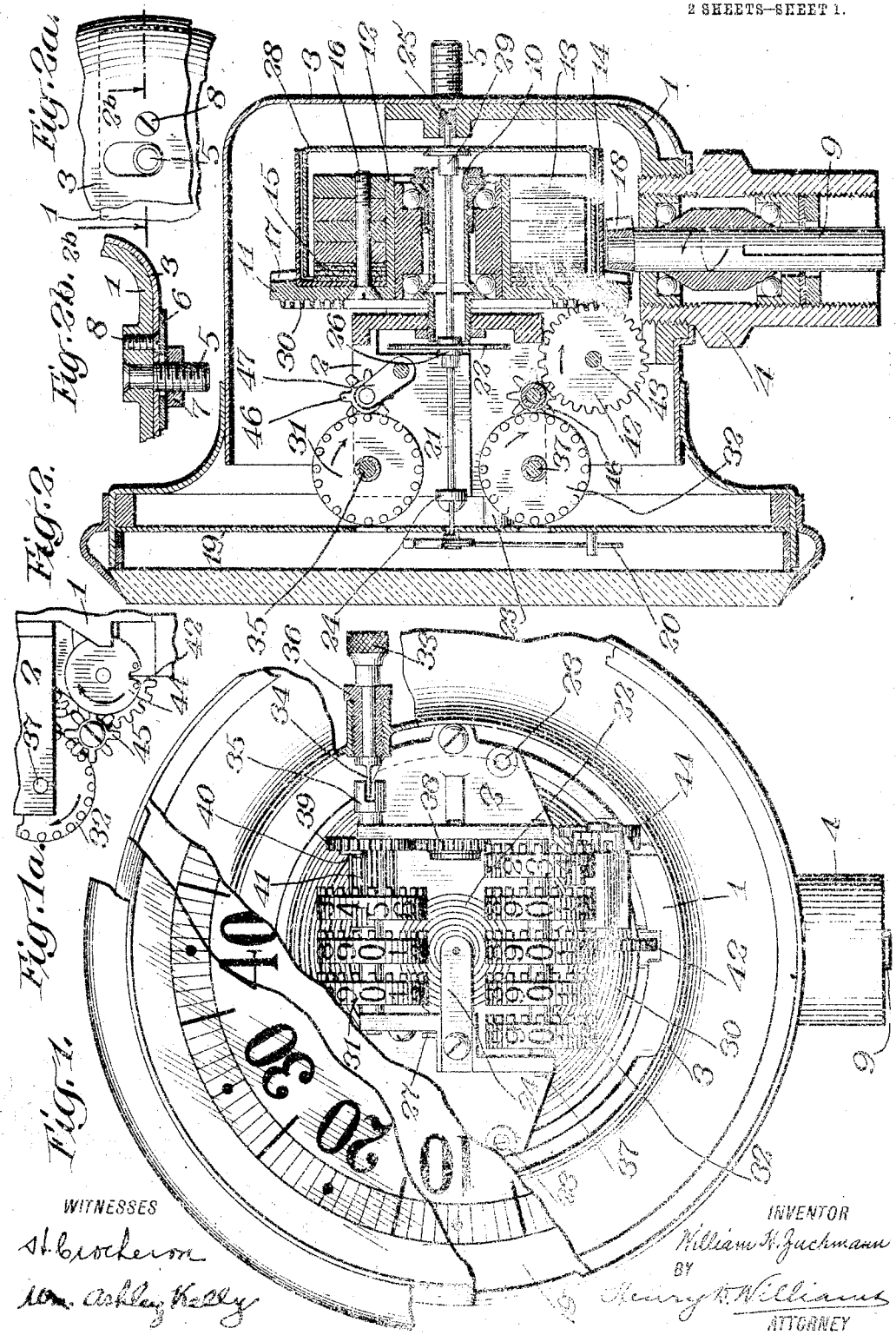

UNITED STATES PATENT OFFICE.

WILLIAM H. ZACHMANN, OF WOODHAVEN, NEW YORK, ASSIGNOR TO AMERICAN EVER READY COMPANY, A CORPORATION OF NEW YORK.

SPEEDOMETER.

1,067,458.

Specification of Letters Patent. Patented July 15, 1913.

Application filed April 19, 1912. Serial No. 691,820.

*To all whom it may concern:*

Be it known that I, WILLIAM H. ZACHMANN, a citizen of the United States, residing at Woodhaven, in the county of Queens and State of New York, have invented a certain new and useful Improvement in Speedometers, of which the following is a specification, reference being had therein to the accompanying drawings, forming part thereof.

My invention relates to combined speed indicators and odometers, commonly known as speedometers, and more particularly to such instruments in which the speed-indicating mechanism is of the magnetic type.

Objects of my invention are simplicity and compactness of construction, inexpensiveness of manufacture, durability, and reliability of operation.

Other more particular objects and advantages of my invention will hereinafter appear.

My invention includes improved means for clamping in a casing a supporting frame for the speed-indicating and odometer mechanisms.

My invention also includes improved odometer driving means combined with the speed-indicating mechanism.

My invention also includes improvements in the speed-indicating mechanism.

I shall now describe the instrument illustrated in the accompanying drawings and embodying my invention and shall thereafter point out my invention in claims.

Figure 1 is a front view of the instrument with some of the parts broken away and others in section. Fig. 1ª is a partial elevation illustrating the odometer driving means as viewed from the right in Fig. 1. Fig. 2 is a central vertical section of the instrument as viewed from the right in Fig. 1. Fig. 2ª is a partial rear view. Fig. 2ᵇ is a section on a plane indicated by the line 2ᵇ—2ᵇ of Fig. 2ª and showing additionally a portion of an attaching bracket and a securing nut. Fig. 3 is a view similar to Fig. 1 with the casing and some parts of the mechanism omitted. Fig. 4 is an elevation as viewed from below in Fig. 3. Fig. 5 is a similar view as seen from the reverse side of Fig. 4, but partly in section. Fig. 6 is a front view of the magnet carrier, with the magnet indicated by broken lines. Fig. 7 is a side elevation on a reduced scale of the instrument mounted on the dashboard of a motor car.

The instrument embodying my invention illustrated in the drawings has a supporting frame, upon which is mounted both the speed-indicating mechanism and the odometer mechanism. This supporting frame is composed of two principal parts or pieces; a rear partially cup-shaped part 1, shown as open at one side as well as at the front, and a forwardly located frame structure 2 extending across the open front of the rear frame part 1 and rigidly secured thereto by means of screws, as is shown in the drawings, the forward frame part 2 having a transverse base plate upon which are forwardly projecting standards. The entire supporting frame is firmly and securely clamped in an outer casing 3 by means now to be described.

A shouldered and screw-threaded bearing sleeve 4, which projects from the side of the casing 3 and at its inner end passes freely through an opening in the casing and screws into a thickened portion of the side wall of the rear frame part 1, clamps the wall of the casing around the opening between the wall of the frame and the shoulder of the bearing sleeve, as clearly appears in Fig. 2. Attaching studs 5 rigidly project from thickened portions of the bottom or back of the rear frame part 1 through slotted holes (Fig. 2ª) in the back of the casing 3 and, after the application of an attaching bracket 6 and nuts 7 (Figs. 2ᵇ and 7), constitute supplementary clamping means coöperative with the bearing sleeve 4 to clamp the entire frame in the casing 3. Small screws 8, located adjacent to the attaching studs 5, are employed to clamp the rear wall of the frame to the back of the casing previous to the application of the nuts 7 for holding the instrument to the attaching bracket 6 employed in mounting the instrument on the motor car dashboard, as appears in Fig. 7. The screws 8 are left in place after the application of the bracket 6, such screws then forming supplemental clamping means, these screws and the elongated or slotted holes in the casing for the studs 5 then being covered by the attaching bracket 6 (Figs. 2ᵇ and 7). The stud receiving holes in the casing 3 are elongated or slotted in order to facilitate the placing of the frame 1—2 in the casing, particularly in view of the fact that the thickened portion of the frame part 1 receiving the bearing sleeve 4 has a slight boss fitting into a corresponding socket in the casing, as appears in Fig. 2.

The mounting of the complete speed-indicating and odometer mechanisms on a frame distinct from the casing gives free accessibility to all parts of the mechanisms in assembling the instrument and also permits complete assembling of working parts to be made as a separate operation from the later mounting of the assembled parts in the casing, the latter operation then being a very simple and easy matter consisting only in inserting the frame 1—2, with the mechanisms mounted thereon, in the casing 3 and clamping the frame in place in the casing by the means hereinbefore described.

The disclosed frame-clamping means assures not only the firm fixing of the mechanisms in correct position in the casing, but also assures proper driving relation with the speed-indicating mechanism mounted on the frame 1—2, of a driving stub shaft 9, journaled in the bearing sleeve 4, this result being accomplished by reason of the fact that such sleeve has a rigid screw-threaded connection directly with the mechanisms-supporting frame 1—2, as hereinbefore described. Also a proper driving relation is assured between the speed-indicating mechanism and the odometer mechanism for driving the latter from the former, by reason of the fact, as hereinbefore explained, that these two mechanisms are both mounted on the common supporting frame 1—2.

The speed-indicating and odometer mechanisms, as to their construction, operation and coöperative relationship, will now be described.

A journal sleeve 10 is screw-threaded through the base plate of the forward part 2 of the supporting frame and projects rigidly toward the back of the instrument. A magnet carrier having a disk 11 and a rearwardly extending hub or sleeve 12 is mounted to rotate on the journal sleeve 10, suitable ball bearings, as shown in Figs. 2 and 6, being interposed between the magnet carrier hub sleeve 12 and the journal sleeve 10. A permanent magnet 13 of that well known type of horseshoe magnet commonly called a "split-ring" magnet, surrounds the sleeve 12 of the magnet carrier rearward from the disk 11. This magnet is shown as made up of several layers or laminæ, as is generally well known in magnet construction. A keeper or magnetic bridge 14 of paramagnetic material has a depending cylindrical skirt which surrounds the magnet 13 in spaced concentric relation thereto and diverts a portion of the magnetic flux to produce a shunt field which crosses the space or air-gap between the magnet 13 and the bridge 14, the magnetic circuit of the shunt field being completed through the bridge. The magnetic bridge 14 also has at the front thereof an annular flat securing portion extending inwardly alongside of the rear face of the magnet carrier disk 11 forwardly from the magnet 13. A spacing ring 15 of non-magnetic material is interposed between the magnet 13 and the flat portion of the bridge 14 to obviate the loss of effective magnetism that would result by direct contact or close proximity of the magnet and this portion of the bridge. For this non-magnetic spacing ring I have employed a number of thicknesses of cardboard, that being the material indicated in the drawings. The magnet 13 and the bridge 14 are firmly secured to the magnet carrier by means of non-magnetic screws 16 passing through the disk 11 of the magnet carrier, through the flat securing portion of the bridge 14, through the spacing ring 15, and through all the laminæ of the magnet 13, being screw-threaded into the last or rearmost of these laminæ only, passing freely through the other laminæ. The disk 11 of the magnet carrier projects peripherally beyond the annular skirt of the bridge 14 and such projecting portion is provided on its rear side with bevel gear teeth 17 forming a bevel gear on the side of the magnet carrier disk 11 adjacent to the magnet 13. Rotation is communicated to the magnet carrier and to the parts carried thereby, including the magnet 13, thereby producing a rotating magnetic field, by means of a bevel pinion 18 meshing with the bevel gear 17 and fixed on the inner end of the driving stub shaft 9, between which and its bearing sleeve 4 are interposed suitable ball bearings, as shown in Fig. 2. The outer end of the short shaft 9 is adapted to be connected to the usual flexible shaft for transmitting rotation from a ground wheel of the motor car, and the bearing sleeve 4 is adapted to receive the usual covering for the flexible shaft. It appears from the foregoing that the magnet 13, and hence the magnetic field, will be rotated proportional to the speed of the motor car.

The motor car speed in miles per hour is indicated on a suitably calibrated dial 19 by a pointer or hand 20 carried by the forward end of a pointer shaft 21 pivoted in the frame 1—2; and such speed is measured by a hair spring 22 attached at its inner end to the pointer shaft 21 and anchored at its outer end portion to the forward frame part 2. The dial 19 is supported on posts 23 projecting forward from the base plate of the forward frame part 2; the pointer shaft 21 near its forward end is pivoted in an arm 24 extending from one of the standards of the frame and the other end of this shaft is pivoted in an adjustable step bearing 25 screwed into the frame part 1 at the back of the instrument; and the hair spring 22 is attached to the pointer shaft 21 through the intermediary of a collar 26 and is anchored to the frame part 2 by means of a pin 27.

To place a torque upon the pointer shaft 21 proportional to the rotative speed of the magnet 13, and therefore proportional to the speed of travel of the motor car, a non-magnetic electrically conductive cup 28, constituting a magnetically-influenced part, is carried by the pointer shaft back of the magnet 13 and has a cylindrical shell extending forward between and in concentric relation to the magnet 13 and the skirt of the keeper 14, but slightly spaced from both the magnet and the keeper, being able to freely swing or oscillate in the air-gap across which a portion of the magnetic flux is diverted by the keeper 14. The central portion of the bottom or flat portion of the conductive cup 28 is shown as secured to the pointer shaft 21 by means of a hub 29. The cup 28 may be composed of any suitable electrically conductive non-magnetic material, of which aluminum is a good example and which I have employed in the instrument illustrated in the drawings. The rotation of the magnet 13 will cause lines of force to cut the conductive cup 28 and, in accordance with well understood laws, will produce eddy currents in the electrically conductive cup 28 and will set up a torque in such cup proportional to the speed of rotation of the magnet 13. This torque, imparted to the pointer shaft 21 by the cup 28, is measured by the hair spring 22 and indicated on the dial 19 by the pointer 20.

The means for driving the odometer mechanism from the speed-indicating mechanism will now be described.

The magnet carrier disk 11 on its forward side, opposite to the magnet 13 and opposite to the gear teeth 17, has a plane face directed toward the front of the instrument and provided with a ridge arranged in a flat spiral forming a volute worm 30 for driving the odometer mechanism.

The odometer mechanism itself may be of any suitable construction and hence that embodied in the present instrument and illustrated in the drawings will be only generally described. It comprises, as is common, two sets of number wheels, the upper set of three wheels 31 belonging to what is commonly known as the "trip" indicator and the lower set of five wheels 32 belonging to the "totals" indicator. The trip indicator only, as is common practice, is equipped with resetting means for resetting the number wheels to the zero indication, such resetting means being indicated on the drawings by the exterior thumb-wheel 33 fixed on an inwardly headed and terminally flattened resetting shaft 34, the flattened end of which detachably takes into a slot in the adjacent projecting end of a shaft 35 carrying the number wheels 31 of the trip indicator.

Incidentally it is to be noted that the reset shaft 34 is carried by a screw-threaded plug 36 screwed into a boss on the casing 3, thereby permitting the reset shaft 34 to be placed in position after the supporting frame 1—2, with the mechanisms carried thereby, has been inserted and clamped in position in the casing 3, as otherwise the inwardly projecting end of the reset shaft 34 would be somewhat in the way in inserting the frame 1—2 into the casing 3.

The number wheels shaft 35 of the trip indicator and a number wheels shaft 37 carrying the number wheels 32 of the totals indicator are both mounted in the forwardly projecting standards of the forward frame part 2, the former shaft being rotative to accomplish the resetting of the trip indicator wheels 31, as hereinbefore mentioned. The units wheel of the trip indicator wheels 31 is driven in unison with the units wheel of the totals indicator wheels 32 from the latter by means of an intermediate idler gear 38 engaged by the driving pins on the side of the units wheel of the totals indicator and meshing with a gear 39 loosely mounted on the trip indicator number wheels shaft 35 to the units wheel of the trip indicator through a spring-pressed pawl 40 carried by the gear 39 and a ratchet 41 connected directly to the units number wheel of the trip indicator, the ratchet connection providing for effecting the resetting hereinbefore described.

The units number wheel of the totals indicator is driven from the volute odometer-driving worm 30 located on the plane forward face of the magnet carrier disk 11. For thus driving the odometer the worm 30 on the magnet carrier engages a gear 42 fixed on the end of a shaft 43 journaled in one of the standards of the forward frame part 2, and the other end of the shaft 43 carries a combined actuating and locking disk 44 provided with a peripheral notch and two laterally projecting pins, one at each side of the notch, this device being commonly known as a "one-tooth pinion." An idler transmitting pinion 45, having alternate long and short teeth, in all four long teeth and four short teeth, engages successively with all its teeth the pins of the units wheel of the totals indicator, two of the long teeth of the pinion 45 resting upon the smooth portion of the periphery of the one-tooth pinion 44 which slides against them (Fig. 1ᵃ) until by reason of the rotation of the one-tooth pinion 44 one of its two pins strikes a short tooth of the transmitting pinion 45, whereupon the latter pinion will be rotated to the extent of two of its teeth by the two pins, the notch at this point in the periphery of the one-tooth pinion 44 permitting the passage of a long tooth of the transmitting pinion 44, after which the smooth portion of the periphery of the one-tooth pinion 44 again locks the transmitting pinion 45, which latter in turn locks and holds the units wheel of the totals indicator, such units wheel having been moved a step equal to the distance between its indicating numbers.

Indicating movement may be transmitted in any suitable manner from the units number wheels successively to the other number wheels. In the odometer mechanism illustrated in the drawings, intermediary eight-toothed transmitting pinions 46 having alternate short and long teeth, in all respects similar to the initial transmitting pinion 45, are employed for this purpose and operate in substantially the same manner as the pinion 45. It should be noted that the transmitting pinions 46 for the number wheels of the trip indicator are carried by a spring-pressed swinging frame 47, as is known in the art, which will yield away from the number wheels to permit their being reset, as hereinbefore set forth.

The location of the disk 11 of the magnet carrier in the casing 3 of the instrument forward from the parts of the speed-indicating mechanism carried by the magnet carrier, with the placing of the odometer-driving worm 30 on the forward face of the magnet carrier disk 11, contributes largely both to simplicity and compactness of construction. According to my invention, the speed-indicating mechanism alone is directly driven by the driving shaft 9, and the magnet carrier is so constructed and arranged as to transmit driving movement to the odometer mechanism, the driving means for the odometer mechanism thus being combined with the speed-indicating mechanism.

By reason of the fact that the magnet carrier disk 11 projects peripherally beyond the parts carried thereby, including the magnet 13 and the annular magnetic bridge 14, space is provided thereon for the odometer-driving worm 30 at the front and for the bevel gear 17 at the back of such disk. This construction provides for rotating the magnet carrier from the pinion 18 and also for rotating the gear 42 of the odometer mechanism from the magnet carrier.

The provision of the flat annular securing portion on the magnetic bridge 14 permits this bridge and the magnet 13 to be secured to the magnet carrier by means of a single set of screws 16, while the bridge 14 may be readily and inexpensively stamped out with the flat securing portion and cylindrical skirt complete.

It is obvious that various modifications may be made in the construction shown in the drawings and above particularly described within the principle and scope of my invention.

I claim:

1. A speedometer comprising a casing, a supporting frame in the casing, speed-indicating mechanism supported by the frame, a bearing sleeve engaging the frame and the casing to clamp the frame to the casing, and a shaft journaled in the bearing sleeve for driving the speed-indicating mechanism.

2. A speedometer comprising a casing, a supporting frame in the casing, speed-indicating mechanism supported by the frame, a bearing sleeve having screw-threaded connection with the frame to clamp the frame to the casing, and a shaft journaled in the bearing sleeve for driving the speed-indicating mechanism.

3. A speedometer comprising a casing, a supporting frame in the casing, speed-indicating mechanism and odometer mechanism both supported by the frame, a bearing sleeve engaging the frame and the casing to clamp the frame to the casing, and a shaft journaled in the bearing sleeve for driving the mechanisms supported by the frame.

4. A speedometer comprising a casing, a supporting frame in the casing, speed-indicating mechanism supported by the frame, a bearing sleeve engaging the frame and the casing to clamp the frame to the casing, an attaching stud for the instrument secured to the frame and projecting to the outside of the casing and serving to further clamp the frame to the casing, and a shaft journaled in the bearing sleeve for driving the speed-indicating mechanism.

5. A speedometer comprising a casing, a supporting frame in the casing, speed-indicating mechanism and odometer mechanism both supported by the frame, a bearing sleeve projecting from the side of the casing and having screw-threaded engagement with the frame to clamp the frame to the casing, attaching studs carried by the frame and projecting through the back of the casing to further clamp the frame to the casing, and a shaft journaled in the bearing sleeve for driving the mechanisms supported by the frame.

6. A speedometer comprising speed-indicating mechanism including a rotative magnet carrier having a plane face provided with a volute odometer-driving worm and a rotative magnet mounted on the magnet carrier, and odometer mechanism including a gear engaged by the worm of the magnet carrier.

7. A speedometer comprising a casing, speed-indicating mechanism including a rotative magnet carrier having a plane face directed toward the front of the casing and provided with a volute odometer-driving worm and a rotative magnet mounted on the magnet carrier, and odometer mechanism in the casing forward from the magnet carrier and having a gear engaged by the worm of the magnet carrier.

8. A speedometer comprising a casing, a supporting frame in the casing, speed-indicating mechanism including a journal sleeve projecting rearwardly from the frame, a magnet carrier rotatively mounted on the journal sleeve and having a plane face directed toward the front of the casing, such face being provided with a volute odometer-driving worm, a rotative magnet carried by the magnet carrier, a magnetically-influenced part within the magnetic influence of the magnet, a pointer shaft rotatively carrying such part and extending through the journal sleeve of the frame; and odometer mechanism including a gear engaged by the worm on the magnet carrier.

9. A speedometer comprising speed-indicating mechanism including a rotative magnet carrier having a disk portion, a magnet carried by the magnet carrier to rotate therewith and of less diameter than the disk portion of the magnet carrier so that the latter projects peripherally beyond the magnet, gear teeth being provided on the projecting portion of the magnet carrier disk on the same side thereof as the magnet, a driving pinion meshing with the gear teeth of the magnet carrier, and means for communicating rotation to the pinion.

10. A speedometer comprising speed-indicating mechanism including a rotative magnet carrier having a hub sleeve and a disk portion provided on one of its sides with a volute odometer-driving worm and on the other of its sides with gear teeth, a rotative magnet carried by the magnet carrier inwardly from the gear teeth on the toothed side of the magnet carrier, odometer mechanism adapted to be driven by the worm of the magnet carrier, a pinion meshing with the gear teeth of the magnet carrier, and means for communicating rotation to the pinion.

11. A speedometer comprising speed-indicating mechanism including a rotative magnet carrier having a hub sleeve and a disk portion, a magnet surrounding the hub sleeve, a magnetic bridge having a cylindrical portion surrounding and radially spaced from the magnet and having a flat portion interposed between the magnet and the disk portion of the magnet carrier, and means in common for securing the magnet and the bridge to the magnet carrier.

12. A speedometer comprising speed-indicating mechanism including a rotative magnet carrier having a plane face provided with a volute odometer-driving worm and a rotative magnet mounted on the magnet carrier, odometer mechanism including a gear engaged by the worm of the magnet carrier, a supporting frame in common for supporting both the speed-indicating mechanism and the odometer mechanism, and a casing inclosing the frame and the mechanisms supported thereby.

13. A speedometer comprising speed-indicating mechanism including a rotative magnet carrier having a plane face provided with a volute odometer-driving worm and a rotative magnet mounted on the magnet carrier, odometer mechanism including a gear engaged by the worm of the magnet carrier, a supporting frame in common for supporting both the speed-indicating mechanism and the odometer mechanism, a casing, a bearing sleeve engaging the frame and the casing to clamp the frame to the casing, and a shaft journaled in the bearing sleeve for driving the mechanisms supported by the frame.

14. A speedometer comprising a casing, a supporting frame in the casing, speed-indicating mechanism and odometer mechanism both supported by the frame, the speed-indicating mechanism including a rotative magnet carrier journaled on the frame and having a hub sleeve and a disk portion, a magnet around the hub sleeve and rotative with the magnet carrier, the magnet being of less diameter than the disk portion of the magnet carrier so that the latter projects peripherally beyond the magnet, such projecting portion being provided with gear teeth located on the same side of the magnet carrier disk as the magnet, a volute odometer-driving worm, being provided on the other side of such disk and directed toward the front of the casing, a bearing sleeve projecting from the casing and having screw-threaded engagement with the frame to clamp the frame to the casing, a drive shaft journaled in the bearing sleeve, a pinion carried by the drive shaft and meshing with the gear teeth of the magnet carrier; and the odometer mechanism including a gear engaged by the worm on the magnet carrier.

In testimony whereof I have affixed my signature in presence of two witnesses.

WILLIAM H. ZACHMANN.

Witnesses:
WM. ASHLEY KELLY,
BERNARD COWEN.